(12) United States Patent  
Mofield (10) Patent No.: US 8,925,668 B1  
(45) Date of Patent: Jan. 6, 2015

(54) BICYCLE WITH POWER ASSISTING FUNCTION

(71) Applicant: Marvin Mofield, Evansville, IN (US)

(72) Inventor: Marvin Mofield, Evansville, IN (US)

(*) Notice: Subject to any disclaimer, the term of this patent is extended or adjusted under 35 U.S.C. 154(b) by 0 days.

(21) Appl. No.: 14/162,811

(22) Filed: Jan. 24, 2014

(51) Int. Cl.
    *B62M 23/02*      (2010.01)
    *B62M 6/45*      (2010.01)

(52) U.S. Cl.
    CPC ........................... *B62M 6/45* (2013.01)
    USPC .................... 180/206.5; 180/206.1

(58) Field of Classification Search
    USPC .............. 180/206.5, 206.1, 205.1, 206.2
    See application file for complete search history.

(56) References Cited

U.S. PATENT DOCUMENTS

| | | | | |
|---|---|---|---|---|
| 3,598,195 A | * | 8/1971 | Steller | 180/206.1 |
| 3,759,339 A | * | 9/1973 | Farrow | 180/216 |
| 5,222,572 A | * | 6/1993 | Yamagiwa et al. | 180/220 |
| 5,226,501 A | * | 7/1993 | Takata | 180/206.2 |
| 5,505,277 A | * | 4/1996 | Suganuma et al. | 180/206.3 |
| 5,857,537 A | * | 1/1999 | Matsumoto et al. | 180/206.5 |
| 5,971,090 A | * | 10/1999 | Tanaka et al. | 180/206.2 |
| 6,920,953 B2 | * | 7/2005 | McGovern | 180/206.5 |
| 7,332,881 B2 | * | 2/2008 | Clark et al. | 318/139 |
| 7,604,079 B2 | * | 10/2009 | Pittman | 180/205.5 |
| 7,870,921 B2 | * | 1/2011 | Terada et al. | 180/206.1 |
| 8,120,291 B2 | * | 2/2012 | Clark et al. | 318/139 |

* cited by examiner

*Primary Examiner* — Tony H. Winner
*Assistant Examiner* — Michael Stabley
(74) *Attorney, Agent, or Firm* — Gary K. Price (57) ABSTRACT

A power assisting device for a bicycle generally including an electric generator, an electric motor and a rheostat. The rheostat includes a mount having a first insert and a second insert. Both inserts include upper and lower apertures. Each upper aperture includes a contact, where in a first position the contacts are in contact with one another, and in a second position the contacts are not. The first insert is attached to the brake lever. Applying the front brakes with the braking lever causes the first insert to move from the first position to the second position. The generator is electrically connected to the upper aperture of the first insert, and the motor is electrically connected to the upper aperture of the second insert. When the braking system is not applied, the inserts are in the first position and the contacts are in contact causing an electrical connection between the rheostat, the generator and the motor. When the bicycle rider applies the bicycle's front brakes, the first insert moves from the first position to the second position. In the second position, the contacts are no longer in contact, breaking the electrical connection between the motor and generator.

20 Claims, 6 Drawing Sheets

BICYCLE WITH POWER ASSISTING FUNCTION

CROSS REFERENCES TO RELATED APPLICATIONS

U.S. Provisional Application for Patent No. 61/757,452, filed Jan. 28, 2013, with title "Bicycle With Power Assisting Function" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not Applicable.

BACKGROUND OF THE INVENTION

1. Field of the Invention

This invention relates generally to bicycles, and more particularly to a bicycle that has a power assisting device that is capable of applying part of its energy from manual power to charge a power source of an electric motor for increasing the distance that the bicycle can travel by being assisted by the power assisting device 2. Brief Description of Prior Art Bicycle riding has been a source of travel and enjoyment for many years. Bicycling is clean, quiet and beneficial to the rider's mental and physical health. However, bicycling does have some disadvantages. Second only to inclement weather, hill climbing presents the greatest obstacle to increased use of bicycles.

Electric-motor-assisted bicycles are known. However, previous attempts to add power to bicycles have severely comprised the essence of bicycling. The prior art seems to utilize overweight, over-expensive, and underpowered electrical motors. Such inventive attempts have been disappointing and incapable of obtaining the desired results.

As will be seen from the subsequent description, the preferred embodiments of the present invention overcome disadvantages of the prior art power assisted bicycles. The present invention is directed to reducing the physical exertion of a bicycle rider when pedaling up hills and to increase the riders speed and enjoyment.

SUMMARY OF THE INVENTION

A power assisting device used for example with a bicycle, generally including an electric generator, an electric motor, a gear pinion, and a rheostat, the gear pinion is mounted on the bicycle frame and is in permanent mesh with the bicycle's rear hub, the gear pinion having sufficient size teeth and spacing to drive the electric generator so as to generate enough electricity to run the small electric motor. The motor is electrically connected to the electric generator and the rheostat, and is manually controlled by the rheostat.

The rheostat includes a mount that has a first insert and a second insert. Both inserts include upper and lower apertures. Each upper aperture includes a brass contact such that in a first position the brass contacts are in contact with one another, and in a second position the contacts are not in contact.

The first insert is attached to a lower portion of the brake lever such that, applying the bicycle's front braking system using the braking lever causes the lower portion of the brake lever and the first insert to move in a direction and most importantly, moves the first insert from the first position to the second position.

The generator is electrically connected to the upper aperture of the first insert, and the motor is electrically connected to the upper aperture of the second insert such that in application, and when the bicycle's braking system is not applied, the inserts are in the first position and the brass contacts are in contact causing an electrical connection between the rheostat, the generator and the motor. When the bicycle rider applies the bicycle's front braking system, the lower portion of the lever moves in the direction causing the first insert to likewise move in the direction, moving the first insert to the second position. In the second position, the brass contacts are no longer in contact, breaking the electrical connection between the motor and generator. As such, when the bicycle's front brakes are applied, the lever temporarily separates the electrical connection between the motor and generator causing the electric motor to immediately stop operating.

A first band or chain is connected between a gear of the motor and an inner gear wheel of the bicycle's rear hub, such that rotating the gear results in turning of the hub and the bicycle's rear wheel. A second band or chain is connected between the gear pinion and an outer gear wheel of the rear hub, such that rotating the gear pinion results in turning the rear hub and the bicycle's rear wheel. The electric generator includes a rotating member that is in communication with the bicycle's rear tire.

DESCRIPTION OF THE PREFERRED EMBODIMENT

The present invention is directed to a bicycle with a power assisting function that will increase the distance that the bicycle can travel by assisting the rider while riding. More particularly, the present invention incorporates a power assisting device that can reduce the physical exertion of a bicycle rider when pedaling up hills, for example. In the broadest context, the bicycle with power assisting function of the present invention consists of components configured and correlated with respect to each other so as to attain the desired objective.

Figure 1:
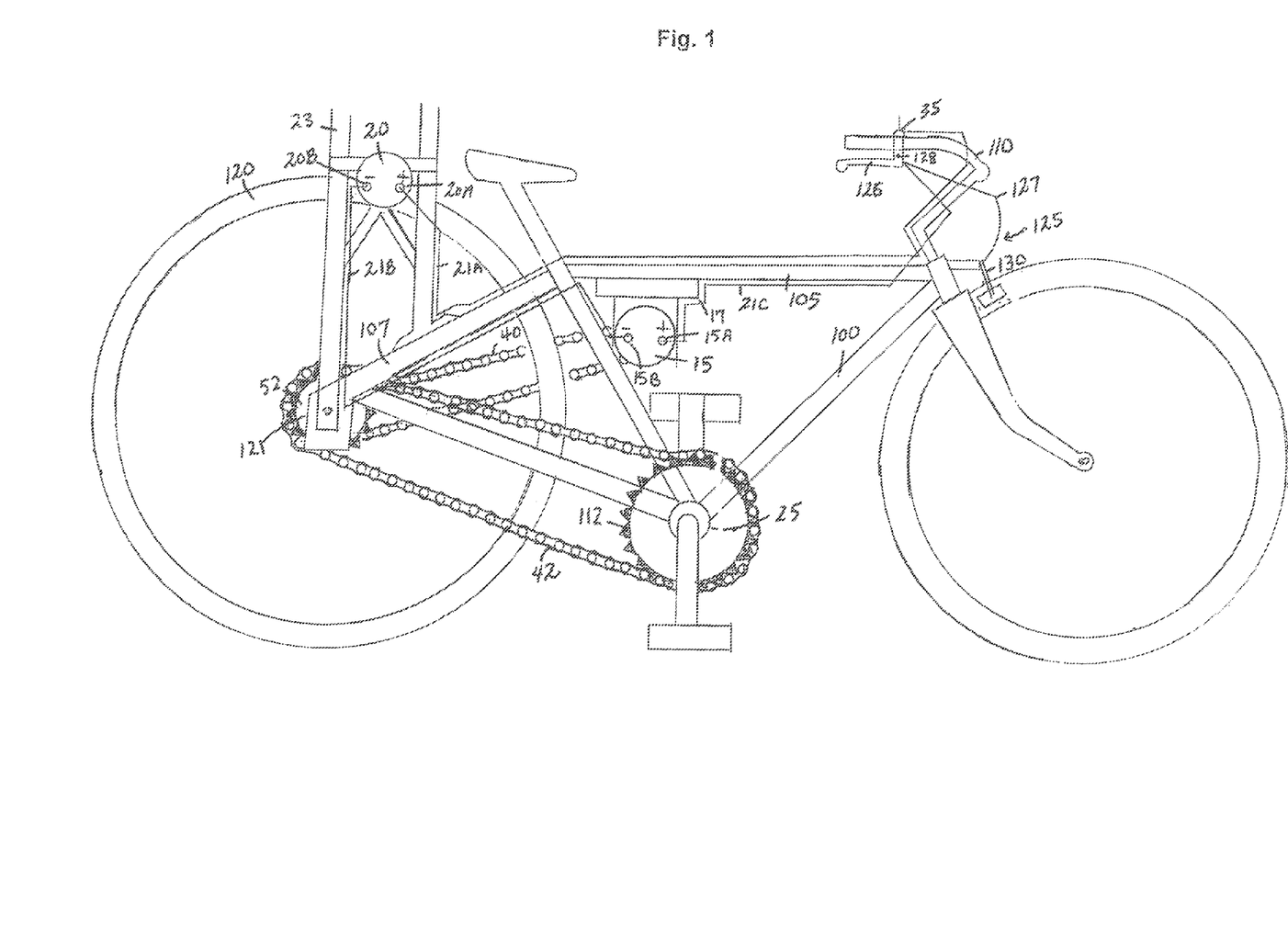
FIG. 1 is a first side view of the present invention, a bicycle with power assisting function.
Figure 2:
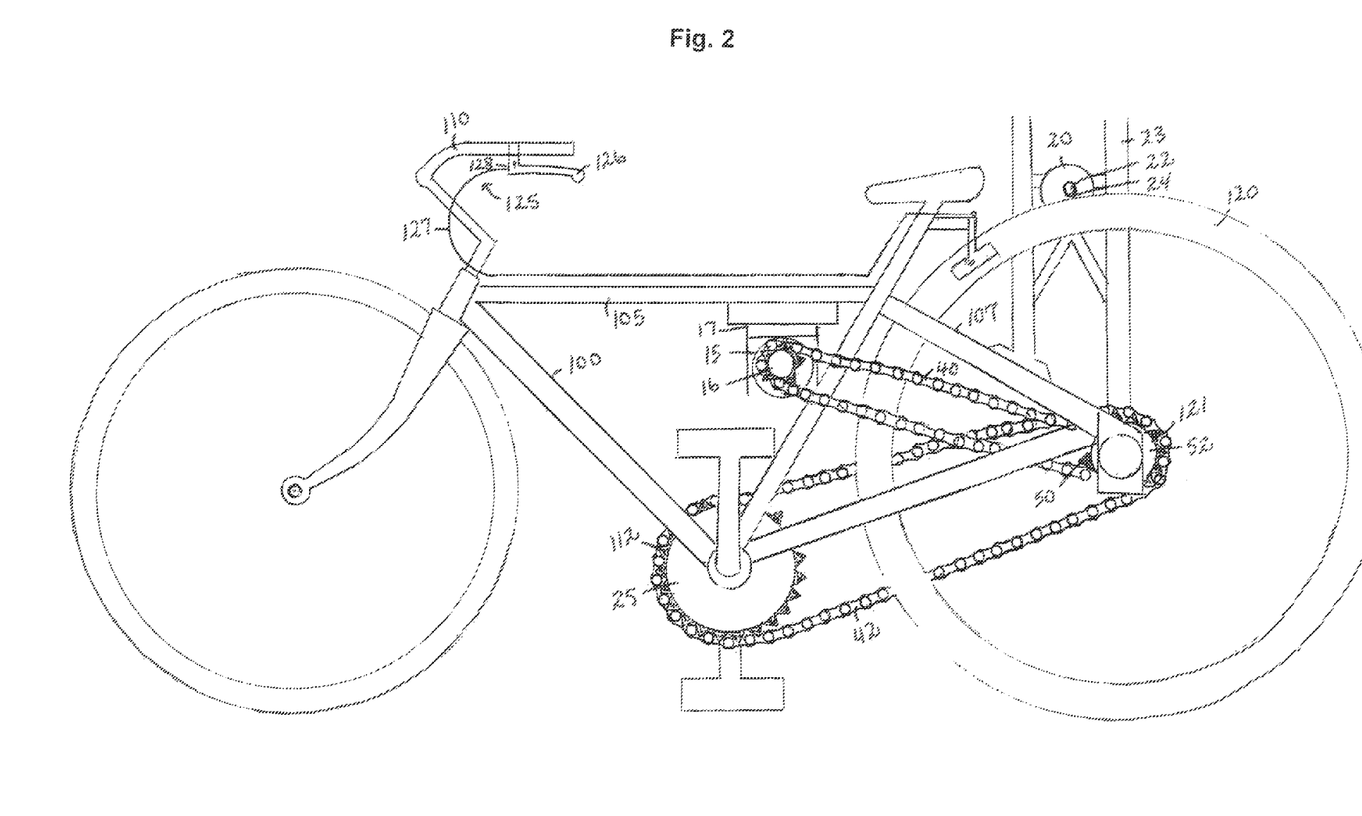
FIG. 2 is an opposite side view of the bicycle with power assisting function of FIG. 1.

Referring now to the drawings, there is seen in FIG. 1 a prior art bicycle frame 100 equipped with the power assisting device made in accordance with the present invention. The power assisting device generally comprising an electric generator 20 for producing electrical energy to run an electric motor 15, a gear pinion 25, and a rheostat 35.

As will be understood, the power assisting device itself is supported by various members of the bicycle frame 100. For example, the electric motor 15 is preferably mounted to the bicycle's cross bar 105; the electric generator 20 is preferably mounted to the bicycle frame's rear bar 107 located behind the seat; the rheostat 35 is advantageously mounted on the bicycle's handle bars 110.

The gear pinion 25 is mounted on the bicycle frame and is in permanent mesh with the bicycle's rear hub 121. As will be discussed, the gear pinion 25 having sufficient size teeth 112 and spacing to drive the electric generator 20 so as to generate enough electricity to run the small electric motor 15.

As illustrated, the motor 15 is electrically connected to the electric generator 20 and the rheostat 35. In particular, a first wire 21A is electrically connected from a first connector (positive) 20A of the generator 20 to an upper aperture 38A (as will be further described) of the rheostat 35. A second wire 21B is electrically connected between a second connector (negative) 20B of the generator 20 and a second connector (negative) 15B of the motor 15. As further illustrated, a first connector (positive) 15A of the motor 15 is electrically connected 21C to an upper aperture 39A (as will be further described) of the rheostat 35. The speed of the motor 15 is manually controlled by the rheostat 35. In the preferred embodiment, the rheostat 35 is situate on the handle bars 110 for convenient access and control by the bicycle rider.

Figure 4:
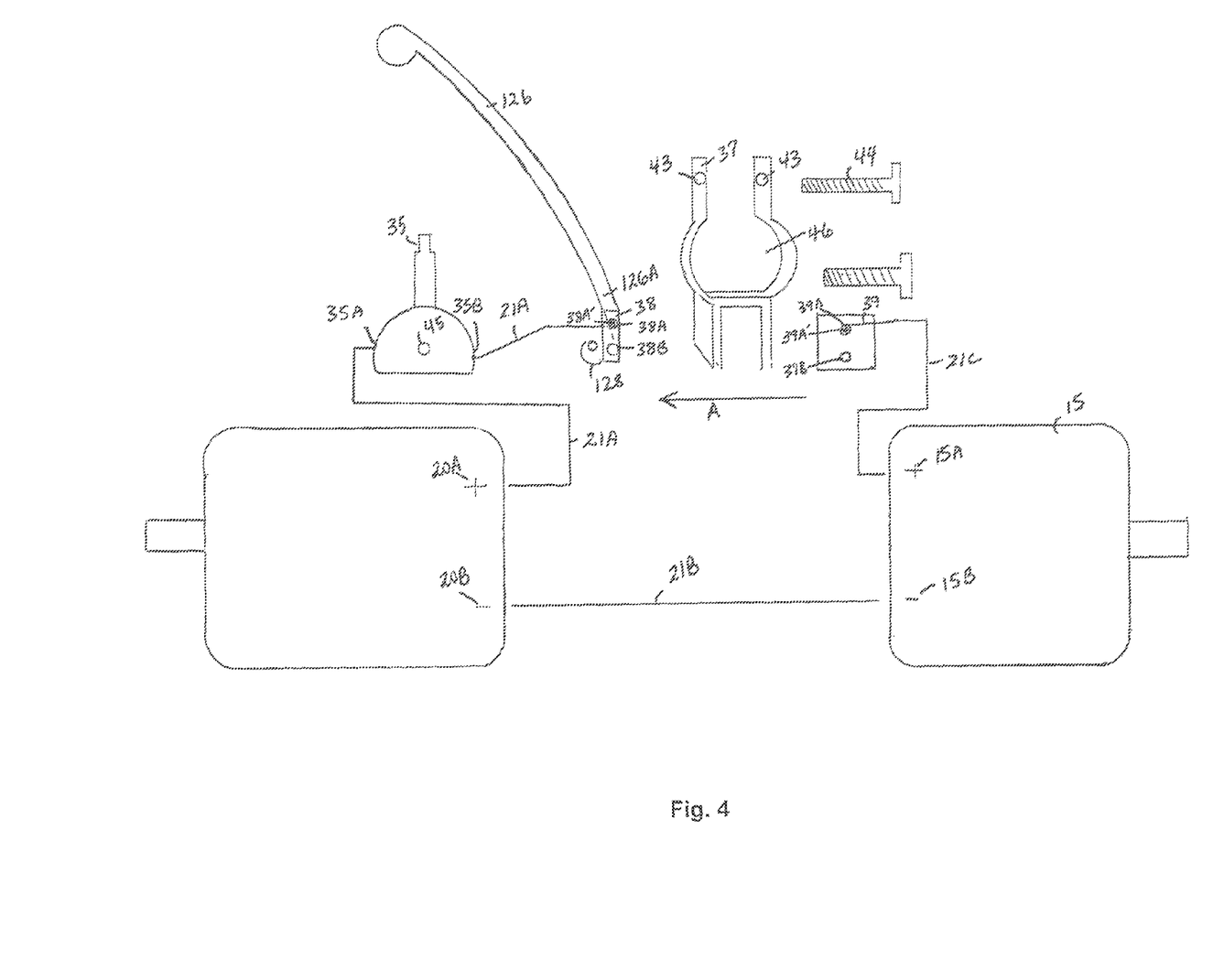
FIG. 4 is an exploded partial view of the bicycle with power assisting function shown in FIG. 1, namely, an exploded view of the bicycle's rheostat components in a first position.

Referring to FIG. 4, there is best illustrated the braking lever 126 and rheostat 35 in electrical communication with the generator 20 and motor 15. As illustrated, a rheostat mount 37 includes a pair of apertures 43 and a bolt 44. In application the apertures 43 align with aperture 45 in the rheostat 35, for receiving bolt 44, attaching rheostat 35 to the upper portion of mount 37. The lower portion of mount 37 defines an opening 46 sized and shaped for mounting to the bicycle's handlebars 110.

The mount 37 further has a first insert 38 and a second insert 39. As shown both inserts 38, 39 include upper apertures 38A, 39A, and lower apertures 38B, 39B, respectively.

In the preferred embodiment, the inserts 38, 39 are constructed of a plastic material, and, the upper apertures 38A, 39A, each include a brass contact 38A', 39A' respectively, such that in a first position the brass contacts 38A', 39A' are in contact with one another, and in a second position the contacts 38A', 39A' are not in contact.

The first insert 38 is attached to a lower portion 126A of the lever 126 such that, as will be further discussed, applying the bicycle's front braking system 125 using the braking lever 126, as known in the art, causes the lower portion 126A and the first insert 38 to move in a direction A and most importantly, moving the first insert 38 from the first position to the second position.

The generator 20 is electrically connected to the upper aperture 38A of the first insert 38. In particular, the first wire 21A is electrically connected from the first connector 20A to a low-voltage side 35A of the rheostat 35. The low-voltage 35A is in communications with an increase voltage 35B of the rheostat 35. The wire 21A then extends from the increase voltage 35B and is electrically connected to the upper aperture 38A.

Figure 5:
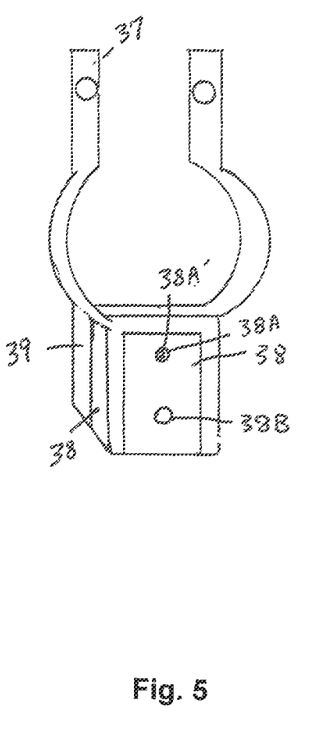
FIG. 5 is a front view of the rheostat mount with inserts with a side of the mount removed to further illustrate positioning of the two (2) inserts.
Figure 6:
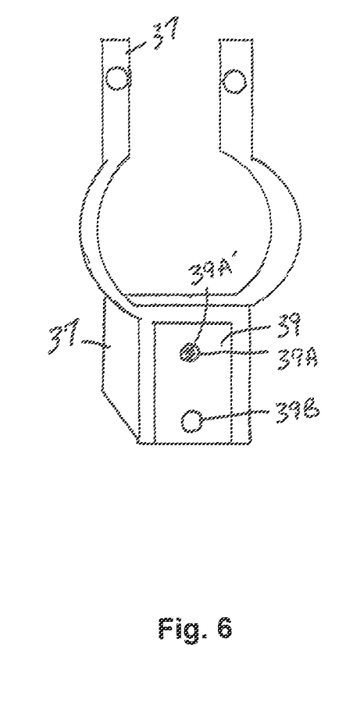
FIG. 6 is a rear view of the rheostat mount with inserts.

The motor is electrically connected 21C to the upper aperture 39A of the second insert 39 such that in application, and when the bicycle's braking system is not applied, the inserts 38, 39 are in the first position (FIG. 5) and the brass contacts 38A', 39A' are in contact causing an electrical connection between the rheostat 35, the generator 20 and the motor 15. When the bicycle rider applies the bicycle's front braking system 125, the lower portion 126A of the lever 126 moves in direction A, causing the first insert 38 to likewise move in direction A, with lower portion 126A, moving the first insert 38 to the second position (FIG. 6). In the second position as described, the brass contacts 38A', 39A' are no longer in contact, breaking the electrical connection between the motor 15 and generator 20. As such, when the bicycle's front brakes 125 are applied, the lever 126 temporarily separates the electrical connection between the motor 15 and generator 20 causing the electric motor 15 to immediately stop operating.

As is known, the bicycle's front braking system 125 includes a brake cable 127 that at one end is connected 128 with the brake lever 126, and on the opposite end is connected with the front brakes 130. With the present invention, the cable 126 extends from the lever 126, and through lower aperture 38B of the first insert 38, and through the lower aperture 39B of the second insert 39, such that the inclusion of the inserts 38, 39 and the other embodiments of the rheostat 35 as described, do not impede the movement and application of the cable 127 and the front braking system 125.

In application, when the bicycle rider releases the lever 126, the front braking system 125 is released, and spring 128 returns the lever 126, and first insert 38, from the second position to the first position with the brass contacts 38A', 39A' in electrical contact.

Figure 3:
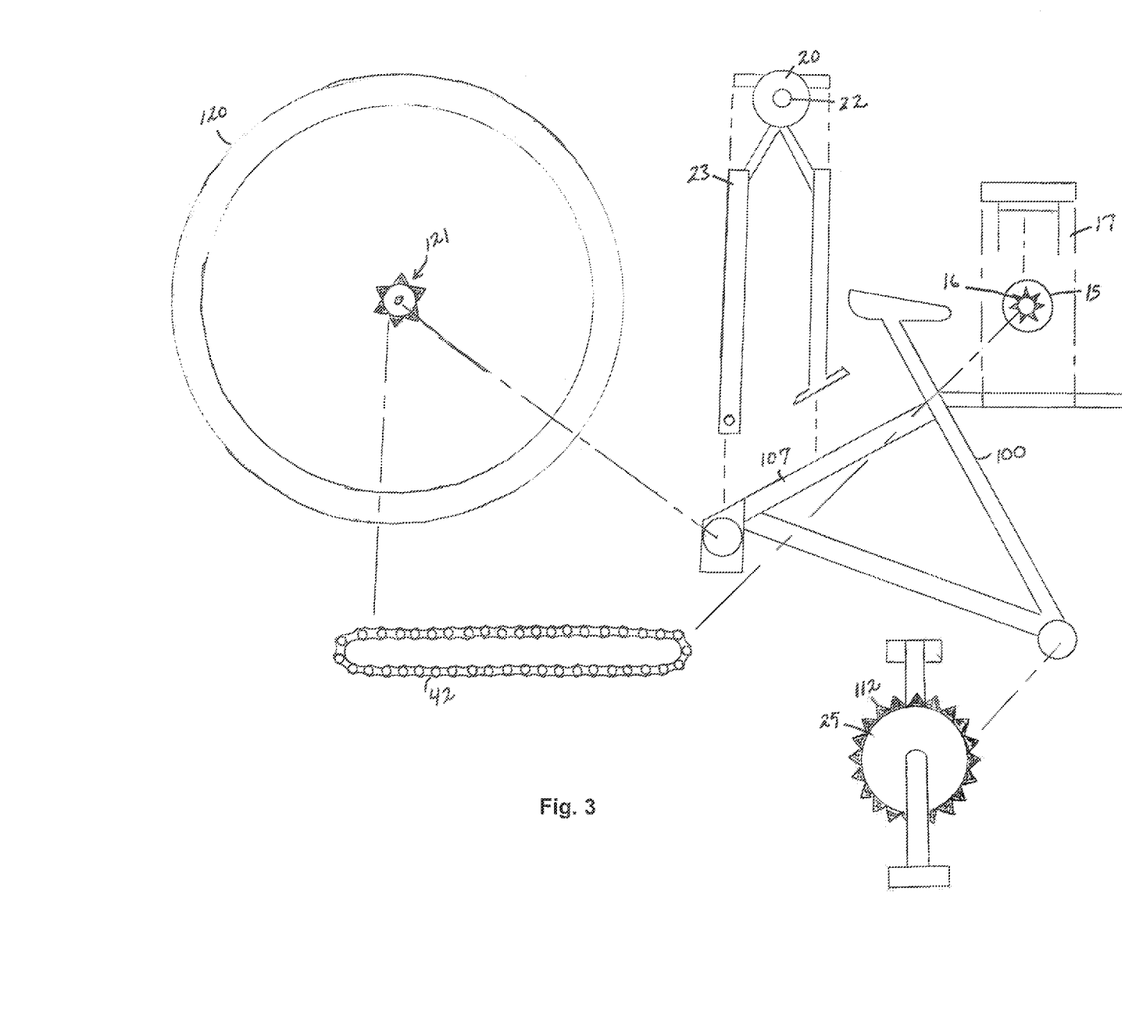
FIG. 3 is an exploded partial view of the bicycle with power assisting function shown in FIG. 1, namely, an exploded view of the bicycle frame's rear section.

As illustrated, a first band or chain 40 is appropriately connected between a gear 16 of the motor 15 and an inner gear wheel 50 of the bicycle's rear hub 121, such that rotating the gear 16 results in turning of the hub 121 and the bicycle's rear wheel 120. A second band or chain 42 is appropriately connected between the gear pinion 25 and an outer gear wheel 52 of the rear hub 121, such that rotating the gear pinion 25 results in turning the rear hub 121, and, as discussed, results in turning the bicycle's rear wheel 120.

The electric generator 20 includes a rotating member 22 that is in induction communication 24 with the bicycle's rear tire 120. As should be understood, rotation of the rear tire 120 results in rotation of the generator's rotating member 22 resulting in turning of the electric generator 20 for producing electrical energy to run the electric motor 15.

In the preferred embodiment, the bicycle's rear wheel is a larger diameter than a standard rear wheel, a standard rear wheel being about 19 inches. In the present invention, a rear wheel diameter of about 36 inches is preferred.

In application, once the generator 20 is at the preferred speed, the bicycle rider can stop manually rotating the gear pinion 25, and, a butterfly clutch (not shown) will disengage and the generator 20 will continue to produce electricity to run the electric motor 15 until rotational energy is lost. Once the gear pinion 25 is reengaged, the generator 20 can turn back up to the desired speed.

When motor 15 is started from rotational rest, torque begins to accelerate the gear 16 of the motor 15. The reaction torque forces the gear 16 to rotate causing the hub 121 to turn and rotate the bicycle's rear tire 120, such that rotational energy is imparted to the bicycle's rear wheel as the hub 121 rotates. Activation of the motor 15 is accomplished simply by turning the motor on using the rheostat 35.

In the preferred embodiment, the electric motor 15 further includes a motor mount 17 attached to the bicycle's crossbar 105 such that the motor 15 is spaced from the crossbar 105. Similarly, the electric generator 20 includes a mount 23 attached to the bicycle's rear bar 107 such that the generator 20 is spaced from the rear bar 107.

Although the above description above contains many specificities, these should not be construed as limiting the scope of the invention but as merely providing illustrations of some of the presently preferred embodiments of this invention. As such, it is to be understood that the present invention is not limited to the embodiments described above, but encompasses any and all embodiments within the scope of the claims.

It would be obvious to those skilled in the art that modifications may be made to the embodiments described above without departing from the scope of the present invention. Thus the scope of the invention should be determined by the appended claims in the formal application and theft legal equivalents, rather than by the examples given.

I claim:

1. A power assisting device for a bicycle, said power assisting device comprising:
    an electric generator,
    an electric motor electrically connected to said generator,
    a rheostat for communicating with a bicycle's front braking system,
    a mount for said rheostat,
    a first insert and a second insert, and wherein said first and second inserts each including an electrical contact,
    a first electrical wire electrically connected between the generator and said electrical contact of said first insert,
    a second electrical wire electrically connected between the motor and said electrical contact of said second insert,
    wherein said first insert defines an on position and an off position, wherein in said on position the electrical contact of said first insert is in contact with the electrical contact of said second insert and said generator is supplying electricity to said motor, and in said second position the electrical contact of said first insert is not in contact with the electrical contact of said second insert breaking the electrical connection between said generator and said motor.

2. The power assisting device as recited in claim 1, wherein applying the bicycle's front braking system causes the first insert to move from the on position to the off position.

3. The power assisting device as recited in claim 1, further including a first band connected between a gear of said motor and a first gear wheel of the bicycle's rear hub.

4. The power assisting device as recited in claim 3, further including a second band connected between the bicycle's gear pinion and a second gear wheel of the bicycle's rear hub.

5. The power assisting device as recited in claim 4, wherein said generator includes a rotating member in contact with the bicycle's rear tire.

6. The power assisting device as recited in claim 1, wherein said first and second inserts are constructed of a plastic material.

7. The power assisting device as recited in claim 5, wherein said electrical contacts are brass contacts.

8. A power assisting device for a bicycle, said power assisting device comprising:
    an electric generator,
    an electric motor,
    a rheostat for communicating with a bicycle's braking system,
    a first insert and a second insert, wherein said first and second inserts each including an upper aperture and a lower aperture, and wherein each of said upper apertures include an electrical contact,
    a first electrical wire electrically connected between the generator and said upper aperture of said first insert,
    a second electrical wire electrically connected between the generator and the motor,
    a third electrical wire electrically connected between the motor and said upper aperture of said second insert,
    wherein said first insert defines a first position and a second position,
    wherein in said first position the electrical contact of said first insert is in contact with the electrical contact of said second insert and in said second position the electrical contact of said first insert is not in contact with the electrical contact of said second insert, wherein applying the bicycle's braking system causes the first insert to move from the first position to the second position breaking an electrical connection between the motor and the generator.

9. The power assisting device as recited in claim 8, further including a first band connected between a gear of said motor and an inner gear wheel of the bicycle's rear hub.

10. The power assisting device as recited in claim 9, further including a second band connected between the bicycle's gear pinion and an outer gear wheel of the bicycle's rear hub.

11. The power assisting device as recited in claim 10, wherein said generator includes a rotating member in contact with the bicycle's rear tire.

12. The power assisting device as recited in claim 8, wherein said first and second inserts are constructed of a plastic material.

13. The power assisting device as recited in claim 8, wherein said electrical contacts are brass contacts.

14. The power assisting device as recited in claim 8, wherein said generator includes a generator mount that is connected to the bicycle's rear bar such that said generator is spaced from the rear bar.

15. The power assisting device as recited in claim 8, wherein said motor includes a motor mount that is connected to the bicycle's crossbar such that said motor is spaced from the crossbar.

16. The power assisting device as recited in claim 8, wherein said rheostat is mounted to the bicycle's handle bars.

17. A power assisting device for a bicycle, said power assisting device comprising:
    an electric generator electrically connected to an electric motor, said generator including a rotating member in contact with a bicycle's rear tire,
    a rheostat in communications with the bicycle's braking system, said rheostat having a first insert and a second insert, and wherein said first and second inserts each include an electrical contact,
    a first electrical wire electrically connected between the generator and said electrical contact of said first insert,
    a second electrical wire electrically connected between the motor and said electrical contact of said second insert,
    wherein said first insert defines a first position and a second position,
    wherein in said first position the electrical contact of said first insert is in contact with the electrical contact of said second insert, and in said second position the electrical contact of said first insert is not in contact with the electrical contact of said second insert,
    wherein applying the bicycle's braking system causes the first insert to move from the first position to the second position.

18. The power assisting device as recited in claim 17, further including a first band connected between a gear of said motor and a first gear of the bicycle's rear hub, and a second band connected between the bicycle's gear pinion and a second gear of the bicycle's rear hub.

19. The power assisting device as recited in claim 17, wherein said first and second inserts are constructed of a plastic material.

20. The power assisting device as recited in claim 19, wherein said electrical contacts are brass contacts.

\* \* \* \* \*